H. L. BOARDMAN.
CASING SPEAR.
APPLICATION FILED JUNE 12, 1914.
1,150,095.
Patented Aug. 17, 1915.
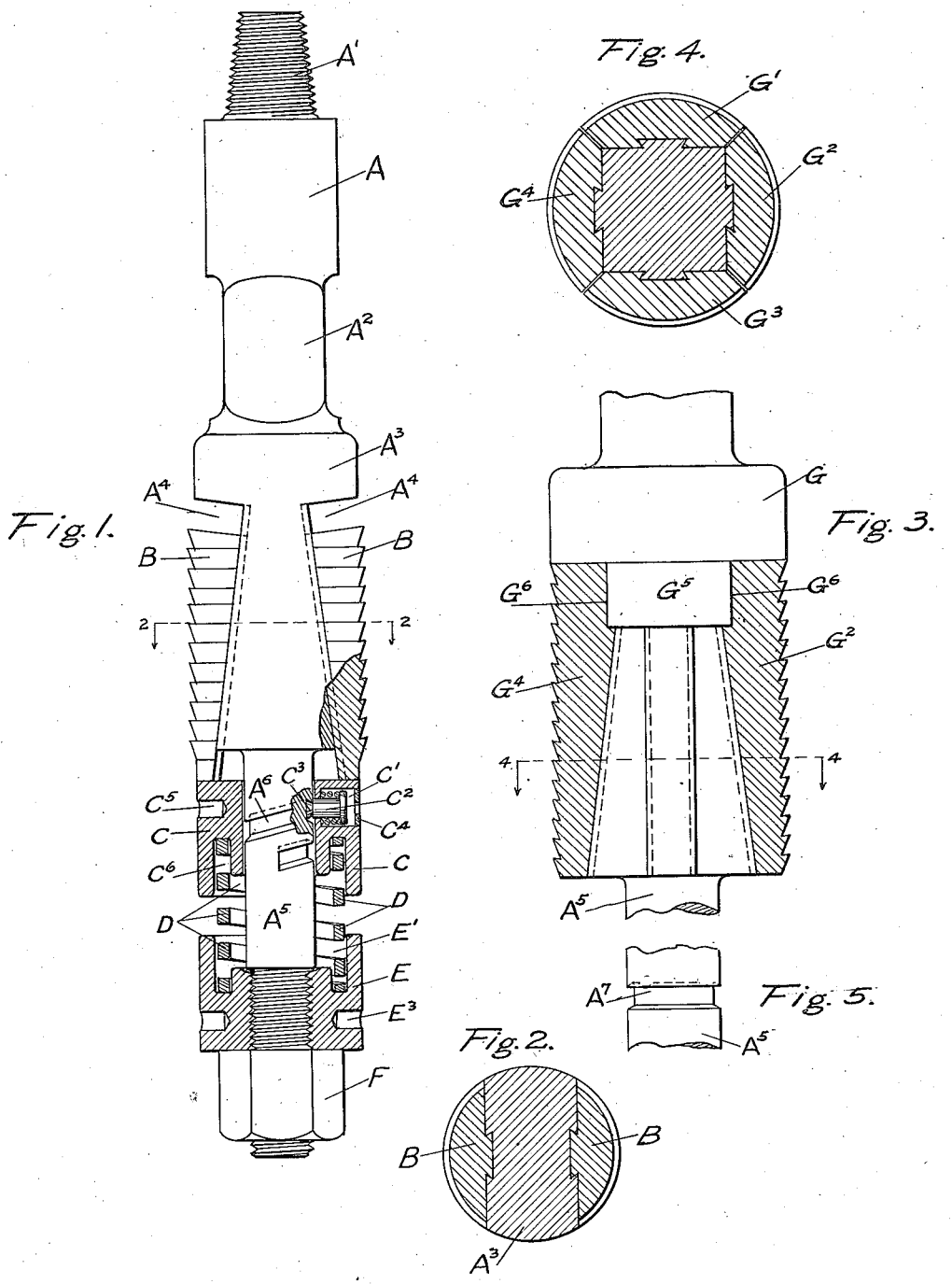

UNITED STATES PATENT OFFICE.

HARRY L. BOARDMAN, OF PORTLAND, OREGON.

CASING-SPEAR.

1,150,095.

Specification of Letters Patent.

Patented Aug. 17, 1915.

Application filed June 12, 1914. Serial No. 844,707.

*To all whom it may concern:*

Be it known that I, HARRY L. BOARDMAN, a citizen of the United States, residing in the city of Portland, county of Multnomah, and State of Oregon, have invented certain new and useful Improvements in Casing-Spears, of which the following is a specification.

My invention relates to casing spears, and more particularly to certain improvements in casing spears which greatly facilitate the setting or adjusting of the spear for use each time, and for use in different sizes of casings, and also facilitates the tripping or releasing thereof so that it can be removed from the casing.

In casing spears now in use, it is necessary to remove or partially remove a nut or other parts in order to set the spear for use each time. This consumes considerable time which I am able by my improvements to save.

In order that others may thoroughly understand my invention, I have shown in the accompanying sheet of drawings a practical embodiment thereof, which I will now describe.

Figure 1 is a side elevation of a casing spear embodying my invention, with parts shown in section; Fig. 2 is a cross sectional view on line 2—2 of Fig. 1; Fig. 3 is a fragmentary view of a casing spear of slightly different construction embodying my invention; Fig. 4 is a cross sectional view taken on line 4—4 of Fig. 3; Fig. 5 is a fragmentary view showing a different setting groove.

In the drawings, the invention as illustrated, comprises a body A, having its upper end tapered and threaded, as at $A'$, for attachment to any suitable stock, and having a squared portion $A^2$, to receive a wrench, the chock portion $A^3$, cut away at its sides, as at $A^4$ to receive the tapered chocks B—B, and a stem $A^5$, provided with a spiraled setting groove $A^6$, the upper edge of which is undercut, as indicated by the dotted lines, and the lower edge of which is tapered or beveled, as shown.

Slidably mounted upon the stem $A^5$ is a collar C, having in its side a chamber $C'$, within which is mounted a spring-actuated plunger $C^2$, the inner end of which is constructed, as at $C^3$, to fit into the spiraled groove $A^6$, so as to underlie the upper edge of said groove, and when moved downwardly relative to the stem $A^5$, to be free from said groove and allowed to be moved back into its chamber $C'$ by its spring, in a manner well understood. The outer end of said chamber $C^8$ is closed with a threaded disk $C^4$, having a square hole therethrough which serves a double purpose, namely, to receive a squared instrument for turning said disk into and out of place, and also as a place for inserting a pin or instrument for the purpose of pressing the plunger $C^2$ inwardly into holding engagement with the groove $A^6$ in the stem $A^5$, when setting the spear for use. The collar C is also provided with a socket $C^5$, whereby it can be turned by means of any suitable pin or instrument in setting or adjusting the spear for use in casings of different sizes. Said collar is also provided in its lower edge with an annular chamber $C^6$ to receive the upper end of a coiled spring D, the lower end of which spring fits into a similar annular chamber $E'$ in a similar collar E, threaded on to the lower end of the stem $A^5$, and adapted to be adjusted thereon, as by means of a pin inserted into the socket $E^3$. By this means the tension of the spring is regulated. A nut F locks the collar $E^3$ in adjusted position.

The chocks B—B have an interfitting sliding engagement with the tapered portion of the body, as indicated, and when in their uppermost positions their outermost edges are flush with the uniform diameter of the body $A^3$. The farther down on the body the chocks B—B are held, the more expanded are they. Therefore, their position longitudinally of the body of the device determines their expansion and consequently the size of casing they will engage. This position is determined by the setting mechanism constituting the spiraled groove $A^6$, the collar C and the plunger $C^2$. With the plunger $C^2$ in the spiraled groove $A^6$, if the collar C is turned in one direction, it moves downwardly, compressing the spring D, and permitting the chocks B—B to descend therewith. As they descend they also expand because of the tapered form of the body. Assuming now that the device is set in the position shown in Fig. 1, it is ready to be inserted into a casing whose inner diameter is substantially the same as the diameter of the expanded chocks B—B. The spear is let down into the casing. The chocks B—B are loose and free to move upwardly and thereby to move inwardly, the tool going down into the casing very readily. Any pull upwardly on the body of the spear causes the chocks to be wedged outwardly against the inside of the casing and to attach thereto. Under the pull said chocks are forced into the sides of the casing and also downwardly sufficiently to force the collar C slightly downwardly on the stem $A^5$ and thereby to free the plunger $C^2$ from the holding edge of the spiraled groove $A^6$ and allow it to be moved back into its chamber $C'$. Now as soon as the pull on the body of the device is released, and it is desired to remove the spear from the casing, a slight downward movement of the body will release the biting engagement of the chocks with the inside of the casing, and the coiled spring D immediately moves the collar C upwardly, and thereby also raises the chocks B—B to their uppermost and innermost positions, thereby rendering them inoperative and making it possible to withdraw the device from the casing.

In Figs. 3 and 4, I have shown a slightly modified form of the casing spear. Below the shoulder G, which corresponds to the shoulder $A^3$ in Fig. 1, the chock body is squared and tapered form, as indicated, and is provided with four chocks, $G^1$, $G^2$, $G^3$ and $G^4$, instead of two chocks, as before shown. These chocks also have an interfitting sliding connection with the body, as indicated. In order to avoid weakness in the tapered portion of the body, instead of having the tapered portion extend uniformly to the shoulder G, I have made the upper part of said tapered body larger and of uniform diameter, as shown at $G^5$, and have accordingly cut out the upper inside corners of the chocks, as at $G^6$—$G^6$, to fit around said portion $G^5$ when they are in their uppermost positions.

In Fig. 5, I have shown a fragmentary portion of the stem $A^5$ of the body provided with an annular groove $A^7$, instead of the spiraled groove $A^6$, shown in Fig. 1. This construction, of course, allows the chocks to be set in one position only, while with the spiraled groove, the chocks can be set at different positions of expansion, because they can be set at different positions longitudinally of the body owing to the spiraled groove.

Thus I have provided certain improvements in casing spears whereby I am able to more quickly and conveniently set and adjust the spear for use each time and also by means of which I am able to adjust it for casings of different sizes, without the necessity of removing any of the parts of the spear.

I am aware that changes can be made in the invention as here illustrated without departing from the spirit thereof, and I do not, therefore, limit the invention to the particular form here shown except as I may be limited by the hereto appended claims.

I claim,—

1. In a casing spear, a body having a tapered portion and adapted to receive a holding member at different points along a portion of its length, a plurality of chocks adjustably mounted on said tapered portion, means normally tending to move said chocks into inoperative position, and a holding member coöperating therewith and adapted to have holding engagement with said body at different points longitudinally thereof, whereby to hold said chocks in various operative positions.

2. In a casing spear, in combination, a body having a tapered portion and provided with a spiraled setting groove, chocks adjustably mounted on said tapered portions, means normally tending to move said chocks into inoperative positions, and means adapted to have holding engagement with said spiraled setting groove, whereby to hold said chocks in different operative positions.

3. In a casing spear of the character referred to, a body having a shoulder, a reduced portion and a tapered portion, said reduced portion being formed between the shoulder and the tapered portion, a plurality of chocks adjustably mounted upon said tapered portion with their upper ends in their inner sides fitted to said reduced portion, means normally tending to move said chocks upwardly into inoperative positions, means for holding said chocks in operative positions, and means for releasing said holding means operable by the downward movement of the spear body.

4. A casing spear comprising a body having a tapered portion, a plurality of chocks adjustably mounted on said tapered portion, a spring-actuated collar normally moving said chocks into inoperative positions, a plunger in said collar adapted to have holding engagement with the body of said spear, and means for releasing said plunger, substantially as described.

5. In a casing spear of the character referred to, in combination, a body, holding chocks adjustably mounted thereon, means for holding said chocks in adjusted positions, means normally tending to return said chocks to inoperative positions, a spring-actuated plunger carried by the means for holding said chocks and adapted to hold the same by interlocking engagement with the body of the spear at different points along a portion of its length, and means for automatically causing the release of said plunger, substantially as described.

6. A casing spear comprising in combination, a body having a tapered portion, tapered holding chocks adjustably mounted thereon, a spring-actuated collar under said chocks normally tending to move them into inoperative positions, a plunger in said collar adapted to be moved into holding engagement with said body, whereby to hold the same in adjusted position, and means for releasing said plunger, substantially as described.

Signed at Portland, Multnomah county, Oregon, this 29th day of May, 1914.

HARRY L. BOARDMAN.

In presence of—
J. C. STRENG,
R. B. FRENCH.